United States Patent Office 3,119,373
Patented Jan. 28, 1964

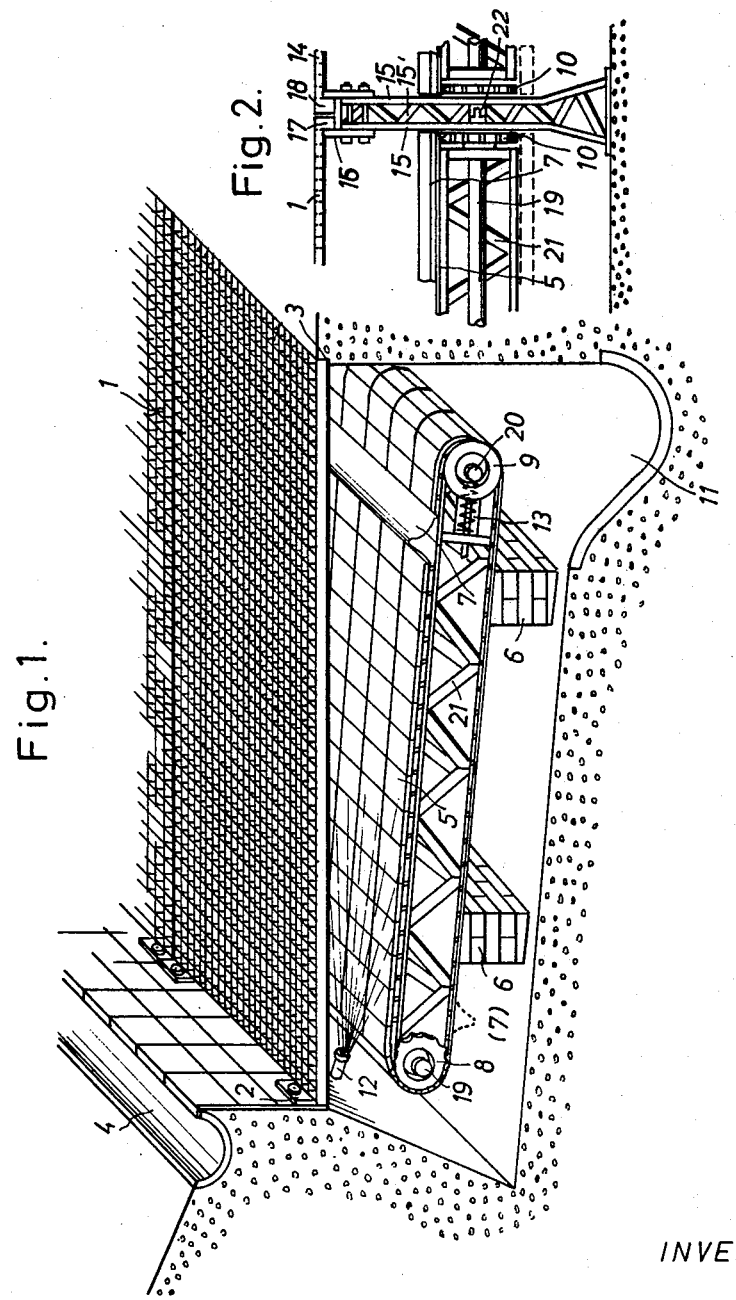

3,119,373
ANIMAL STALL CLEANSING ARRANGEMENTS
Alois Schmid, Weihermuhlstr. 177t, Regenstauf,
Oberpfalz, Germany
Filed Dec. 21, 1960, Ser. No. 77,456
Claims priority, application Germany Dec. 23, 1959
13 Claims. (Cl. 119—28)

In modern stabling arrangements efforts are made to compensate for the existing lack of personnel and to relieve the burden on available staff by extensive simplification and automaticity of demanuring devices and with this object in view, the present invention provides a particularly advantageous arrangement wherein above an inclined surface extending over an entire animal stall of a stable there are provided a grating likewise extending over the whole stall and means for automatically, at least from time to time, carrying away deposited dung and fodder residues in the longitudinal direction of the stall to a collecting channel or gutter.

Embodiments of the invention are shown in the accompanying drawings in which FIG. 1 illustrates, in perspective, an animal stall with the cleansing arrangement below the floor of the stall; FIG. 2 shows a partition between two adjacent stalls. Referring now in more detail to the drawing, there is in the embodiment of FIGURE 1 a stall of the animal stable provided with a grating 1 extending completely thereover, which is suspended at 2 from the side of the fodder rack and rests at 3 on a suitable floor ledge. The grating is connected, by the animals head, directly to a fodder rack 4. Preferably a grating with the appropriate additional means is arranged as described below for each animal stall. The upper part of the grating should be as little sharp-edged as possible, and if desired this part may have a coating of synthetic material, i.e. plastics. Also the mesh may be closer at the head end than at the waste end.

Below the grating 1, there is located an inclined plane 5 consisting of any suitable chemically inactive material, for example, light plastic sheets, or for example, thick smooth-surfaced reinforced concrete sheets of 4 to 6 centimetres thickness, which inclined plane rests freely but undisplaceably on supporting walls or pillars 6 or may be otherwise connected. A pusher 7 moves over the inclined plane its movement being effected by means of a motor, not illustrated, in association with a chain and roller drive 8, 9. The motor suitably is reversible. At the head end of the inclined plane 5 is a spraying nozzle 12, with which by means of a not illustrated actuating device, the inclined plane can be scoured from time to time, after or during which the pusher 7 is operated to push the dung in front of it. The wall supports 6 or other supports have sufficient slope in the longitudinal direction and the floor sufficient gradient that any liquids or dung falling past are led away.

A drainage gutter 11 formed from suitably shaped earthenware or concrete carries away the dung and the wash water and permits this to be taken off through channels and pumping device either directly to the fields or to a wagon.

The spacing of the inclined plane from the under edge of the grating, amounts at the lowest position to about 8 centimetres. The gradient is directed along the length of the stabling.

The water-jet nozzles 12 located below the fodder manger are arranged suitably at intervals of 90 centimetres each, or one for each animal, and may, for example, be switched on automatically or be actuated by hand once a day, and the excrement washed into the collecting gutter. The viscous liquid manure resulting therefrom drains itself away by means of a suitable gradient of the gutter into a liquid manure pit or the like.

In long stablings an additional water jet can be directed from the highest point of the channel, through a pipe, thereby ensuring that the channel or gutter can always be kept clean. The development of the water pressure for the nozzles 12, located below the fodder manger, is effected by means of a pressure pump, the capacity of which is determined by the range of the installation. The water essential for this purpose can be obtained either from existing ponds, wells or lakes or from a main supply. In taking it from the main's supply, preferably a reserve container is also constructed, since the water required at the moment of scouring may not flow sufficiently through the normal pipe conduits.

In order to maintain the conveyor 10, for the pusher bar 7, constantly under tension, a tensioning device in the form of a spring 13 is arranged at one of the two rotating shafts, especially that for the roller 9 which is not driven, the spring acting in known manner on the bearing of the rotating shaft 20.

In the embodiment according to FIGURE 2, a partition 15, extending to the floor is constructed between two neighboring animal stalls or gratings 1 and 14, which partition is forked at its upper end with lateral guide plates 16, in order to receive the suitably angled edges 17 and 18 of the two neighboring gratings 1 and 14. In the embodiment illustrated, the partition consists of two thin metal plates 15, which are connected by struts 15'.

The rotating shafts 19 and 20 (see also FIGURE 1) are at the same time mounted in the partition 15, which suitably contains coupling means 22 in or near the partitions 15. These shafts serve for their part to carry the drainage surface 5 which may, if desired, be stiffened by a lattice construction 21. In the embodiment according to FIGURE 2, the dung pusher bars 7 extend closely or completely up to the partition 15, and thereby take with them the collected dung in the intermediate space, without fear of any being turned aside because of the short length of the section. The pusher bars 7 are connected at the ends to a conveyor belt or conveyor chain 10 one of these being arranged directly against either side of the partition 15. The partition 15 stands freely on the floor so that there is no fear of jamming even in large stables. In the embodiment according to FIGURE 2, the conveyor belts with the pusher bars always rotate in the same direction so that reversal of the motor is not necessary.

In the establishments according to the invention strewing with straw is no longer necessary. The farmer, can therefore, for example, insofar as he possesses a threshing machine, chop the straw, which he hitherto used for strewing purposes, on the field and allow it to lie as dung which is naturally of importance at harvest time in saving considerable work, and permits also the use of smaller barns or granaries than heretofore.

With the arrangement of the present invention, the animals in the stable always lie or stand in dry conditions, and the risk of pestilence is thereby substantially removed and the rearing of the animals substantially facilitated. In place of straw manure, the farmer in future will only need to convey liquid manure to his fields, and will thus avoid the time consuming and laborious laying and strewing of manure.

The clarification arrangements must naturally have suitable capacities but they can be kept suitably small or may be completely dispensed with if the liquid manure is distributed by pipe conduits to the fields and meadows.

I claim:

1. The combination in an animal stall of a demanuring cleansing arrangement, said animal stall having a plurality of individual stands for large cattle in side-by-side relation, each one of said stands having a feed-trough on the head end thereof; comprising individual gratings for each animal, said gratings arranged in side-by-side relation and extending over and spaced above substantially the entire floor of said stall, said floor having a waste gutter common to all said stands at the rear ends thereof, an inclined plane supported between each of said gratings and said floor, said inclined planes extending from said feed-trough ends slopingly to said rear ends of said stands and cleansing means extending over the full width of each of said stands, said cleansing means being disposed between said inclined planes and said gratings for removing matter deposited on said inclined planes into said gutter.

2. The combination in an animal stall of a demanuring cleansing arrangement, said animal stall having a plurality of individual stands for large cattle in side-by-side relation, each one of said stands having a feed-trough on the head end thereof; comprising individual gratings for each animal, said gratings arranged in side-by-side relation and extending over and spaced above substantially the entire floor of said stall, said floor having a waste gutter common to all said stands at the rear ends thereof, said gutter lying transversely to the longitudinal axis of said gratings, an inclined plane supported between each of said gratings and said floor, said inclined planes extending from said feed-trough ends slopingly to said rear ends of said stands, and cleansing means being disposed between said inclined planes and said gratings at the higher ends of said inclined planes for directing water onto said inclined planes for removing matter deposited on said inclined planes into said gutter.

3. The combination in an animal stall of a demanuring cleansing arrangement, said animal stall having a plurality of individual stands for large cattle in side-by-side relation, each one of said stands having a feed-trough on the head end thereof; comprising individual gratings for each animal, said gratings arranged in side-by-side relation and extending over and spaced above substantially the entire floor of said stall, said floor having a waste gutter common to all said stands at the rear ends thereof, said gutter lying transversely to the longitudinally axis of said gratings, an inclined plane inclined in the longitudinal direction of the axis of the gratings and supported between each of said gratings and said floor, said inclined planes extending from said feed-trough ends slopingly to said rear ends of said stands; and cleansing means being disposed between said inclined planes and said gratings at the higher ends of said inclined planes for directing water onto said inclined planes for removing matter deposited on said inclined planes into said gutter.

4. The combination in an animal stall of a demanuring cleansing arrangement, said animal stall having a plurality of individual stands for large cattle in side-by-side relation, each one of said stands having a feed-trough on the head end thereof; comprising individual gratings for each animal, said gratings arranged in side-by-side relation and extending over and spaced above the entire floor of said stall, said floor having a waste gutter common to all said stands at the rear ends thereof, an inclined plane supported between each of said gratings and said floor, said inclined planes extending from said feed-trough ends slopingly to said rear ends of said stands and cleansing means extending over the full width of each of said stands, said cleansing means being disposed between said inclined planes and said gratings including scrapers mounted for movement along the upper surfaces of said inclined planes for removing matter deposited on said inclined planes into said gutter.

5. The combination in an animal stall of a demanuring cleansing arrangement, said animal stall having a plurality of individual stands for large cattle in side-by-side relation, each one of said stands having a feed-trough on the head end thereof; comprising individual gratings for each animal, said gratings arranged in side-by-side relation and extending over and spaced above the entire floor of said stall, said floor having a waste gutter common to all said stands at the rear ends thereof, said gutter lying transversely to the longitudinal axis of said gratings, an inclined plane inclined in the longitudinal direction of the axis of said gratings and supported between each of said gratings and said floor, said inclined planes extending from said feed-trough ends slopingly to said rear ends of said stands, cleansing means including water jets mounted below said gratings and above the higher ends of said inclined planes and scraper means mounted for movement along the upper surfaces of said inclined planes, said cleansing means being adapted to remove matter deposited on said inclined planes into said gutter.

6. A demanuring cleansing arrangement in accordance with claim 5, wherein the inclined plane is freely but undisplaceably mounted on pillars.

7. A demanuring cleansing arrangement in accordance with claim 5 wherein the scraper means comprises at least two pushers spaced apart and extending transversely across the inclined plane and being carried by a conveyor mounted on rollers located at either end of and below the inclined plane, means being provided for driving at least one of said rollers.

8. A demanuring cleansing arrangement in accordance with claim 5 wherein the scraper means comprises at least two pushers spaced part and extending transversely across the inclined plane and being carried by a conveyor mounted on rollers located at either end of and below said inclined plane, means being provided for driving one of said rollers and spring means being provided for tensioning the non-driven roller.

9. The combination in a pair of neighbouring animal stalls of a demanuring cleansing arrangement, comprising a pair of gratings respectively extending over, and spaced above the floor of said stalls, said floor having a waste gutter common to said stalls at one end thereof, a partition extending between each of said gratings and said floor, a pair of spaced apart rotatable shafts below each of said gratings supported by said partition, a conveyor carried by each of said pairs of rotatable shafts, an inclined plane below each of said gratings and supported by the bearings of the respective pair of rotatable shafts and cleansing means including means for directing water onto the surface of each of the inclined planes and scraper means for removing matter deposited on each of said inclined planes, said scraper means being mounted for movement with each of said conveyors.

10. The combination in a pair of neighbouring animal stalls of a demanuring cleansing arrangement comprising a pair of gratings respectively extending over, and spaced above the floor of said stalls, said floor having a waste gutter common to said stalls at one end thereof, said gratings having a flanged longitudinal edge, a partition extending between each of said gratings and said floor, the upper part of said partition being adapted to receive and engage the flanged edges of neighbouring gratings, a pair of rotatable shafts below each of said gratings supported by said partition, a conveyor carried by each of said pairs of rotatable shafts, an inclined plane below each of said gratings inclined in the direction of the longitudinal axis of a grating and supported by the bearings of the respective pair of rotatable shafts, and cleansing means including means for directing water onto an inclined plane from the higher end thereof, and scraper means for removing matter deposited on each of said inclined planes, said scraper means comprising pusher bars carried by each of said conveyors and mounted transversely across an inclined plane.

11. A demanuring cleansing arrangement in accordance with claim 10, wherein the rotatable shafts of each conveyor carry rollers located at either end of and below each inclined plane, means being provided for driving at least one of said rollers and spring means being provided for tensioning a non-driven roller.

12. A demanuring cleansing arrangement in accordance with claim 10, wherein a conveyor includes a chain located immediately on either side of the partition, the chain for each conveyor carrying at least two pusher bars.

13. A demanuring cleansing arrangement in accordance with claim 11, wherein the pusher bars of the scraper means extend across the inclined plane up to the partition wall.

References Cited in the file of this patent
UNITED STATES PATENTS

| | | |
|---|---|---|
| 712,516 | Frost et al. | Nov. 4, 1902 |
| 714,677 | Combs | Dec. 2, 1902 |
| 2,448,120 | Petraske | Aug. 31, 1948 |
| 2,687,113 | Gault | Aug. 24, 1954 |
| 2,701,547 | Shaw | Feb. 8, 1955 |
| 2,843,086 | Graham | July 15, 1958 |

FOREIGN PATENTS

| | | |
|---|---|---|
| 801,797 | Germany | Jan. 25, 1951 |